US006950508B1

(12) United States Patent
Griffiths

(10) Patent No.: US 6,950,508 B1
(45) Date of Patent: Sep. 27, 2005

(54) SYSTEM AND METHOD FOR PROVIDING AN AWAY-FROM-HOME CALLING SERVICE

(75) Inventor: Michael Griffiths, Duluth, GA (US)

(73) Assignee: BellSouth Intellectual Property Corp., Wilmington, DE (US)

(*) Notice: Subject to any disclaimer, the term of this patent is extended or adjusted under 35 U.S.C. 154(b) by 689 days.

(21) Appl. No.: 09/604,963

(22) Filed: Jun. 28, 2000

(51) Int. Cl.[7] ........ H04M 3/92
(52) U.S. Cl. ........ 379/201.01; 379/207.13; 379/207.02; 379/221.08
(58) Field of Search ........ 379/201.02, 201.03, 379/201.05, 201.12, 207.12, 219, 220.01, 379/221.02, 221.08, 207.02

(56) References Cited

U.S. PATENT DOCUMENTS 5,701,301 A 12/1997 Weisser, Jr. ........ 370/428
5,978,450 A * 11/1999 McAllister et al. .... 379/207.13
6,067,456 A * 5/2000 Duran ........ 379/201.01
6,101,246 A * 8/2000 Heinmiller et al. ........ 379/142
6,167,119 A * 12/2000 Bartholomew et al. 379/201.02

OTHER PUBLICATIONS

*American National Standard T1.110-1992. Signaling System No. 7 (SS7)- General Information,* Chapter T1.110.1, T1.110.2, T1.110.3 and T1.110.4.

* cited by examiner

*Primary Examiner*—Fan Tsang
*Assistant Examiner*—Ovidio Escalante
(74) *Attorney, Agent, or Firm*—Withers & Keys, LLC

(57) ABSTRACT

An away from home calling service allows users to use telephones other than their home telephone as if they were using their home telephone. When traveling away from home, subscribers access the service and are prompted to provide authentication and validation information, as well as call completion information. The away-from-home calling service obtains the services provisioned on the subscriber's home telephone line and completes the call according to the subscriber's home services.

19 Claims, 2 Drawing Sheets

SYSTEM AND METHOD FOR PROVIDING AN AWAY-FROM-HOME CALLING SERVICE

BACKGROUND

1. Field of Invention

The present invention relates generally to the field of provisioning telephony services. More specifically, the present invention relates to the field of provisioning telephone services for telephone subscribers who are not at home.

2. Background of the Invention

Telephone use permeates our daily lives, and access to telephone service is required to function productively in modern society. Most people take access to such telephone service for granted. Moreover, access to telephone service enables mobility, allowing people to travel away from home without losing the ability to communicate with others. Consequently, telephone companies strive to facilitate access to telephone service for people who travel away from home.

For example, calling cards allow people to make telephone calls for a fee from telephones that they do not own, for example, public pay telephones. To use a calling card, a caller dials a calling card access number. Once a connection is established, the caller is generally directed to enter a calling card number and security code, often referred to as a personal identification number (PIN). The calling card number corresponds to the billing account number for the caller. The PIN provides a mechanism for confirming that the caller has authority to use the calling card.

There are two varieties of calling cards: prepaid and non-prepaid. With pre-paid calling cards, a user pays a certain amount of money to a calling card provider. The amount is credited to the user's account prior to using the card. The user can then make fee calls using the card until the amount in the user's account is exhausted. Generally, prepaid calling cards are rechargeable. That is, more money can be paid into the calling card account to increase the amount in the account. In addition, prepaid calling cards usually charge a fixed cost per unit time, generally minutes.

There are several disadvantages to using prepaid calling cards. Because there is a fixed cost per minute, calls often cost more than they should. This is because prepaid calling cards do not take advantage of special rates, for example, lower rates offered for telephone calls made at night. Moreover, a conversation ends when the prepaid amount runs out, whether the caller desires to end the conversation or not. In addition, there is often a surcharge per call. The surcharge is an overhead charge that does not provide the caller with any additional connection time. Further, many prepaid calling cards do not require authorization prior to their use. Consequently, there is little protection when a prepaid calling card is lost or stolen.

A second type of calling card is a non-prepaid calling card. A non-prepaid calling card is generally provided by a telephone company to a user. When the user desires to make a telephone call, he or she dials a calling card access number provided by the telephone company and is prompted to enter a calling card number, a security code and the desired telephone number. Unlike prepaid calling cards however, there is no limit to the length of the conversation. Charges accrue for the entire length of the telephone call. The user is billed for telephone calls at the end of a period, generally a month.

Despite the unlimited calling time, there still remain disadvantages with non-prepaid calling cards. There is usually a surcharge added to each call. Moreover, the rates for non-prepaid calling cards are generally higher than for calls made from home or using prepaid calling cards.

A more significant disadvantage of using calling cards, whether prepaid or non-prepaid, and with conventional away-from-home telephone service in general, is that the subscriber does not have access to the services provisioned on his or her home telephone line. Consequently, when people travel, they do not have access to the services they have become accustomed to when using their home telephones.

SUMMARY OF THE INVENTION

The present invention overcomes the disadvantages of conventional systems by allowing a telephone user to make a telephone call from remote telephones as if he or she was making the telephone call from his or her home telephone. Thus, a subscriber can make a telephone call from a hotel or pay telephone for example, but be billed as if the call originated from the subscriber's home telephone. The subscriber can also take advantage of any services that he or she may have provisioned on their home line, including for example, conference calling and call forwarding. Thus, the present invention effectively provides an extension of the subscriber's home telephone when the subscriber is using a telephone away from home.

A key advantage of the present invention is that it bills users at the rate of the subscriber's local phone. Thus, when a subscriber is away from home and uses the present invention he is charged as if he or she is using his or her local telephone, despite any charges that would otherwise be incurred.

In addition, the present invention allows a subscriber to access services that he or she may have provisioned on his or her home line and use them from a remote telephone as if he or she was using her home telephone. For example, if a subscriber has conference calling provisioned on his or her home telephone, he or she can use that feature when using a remote telephone. Thus, for example, a subscriber in a hotel room can use the present invention to make a telephone call and then conference in a third person, just as if the subscriber were performing the same operation using his or her home phone.

In one embodiment, the present invention is a system for providing away from home calling service in which a telephone subscriber makes a telephone call. The system includes a telephone switch coupled telephonically to the subscriber telephone. A trigger is provisioned on the switch to intercept telephone calls that will use the away-from-home calling service. A service control point is coupled to the telephone switch to receive an authentication request from the switch. The system also includes a line database for storing authentication and verification information as well as service information regarding the home telephone services provisioned on the telephone subscriber's home telephone line. The line database provides information regarding the telephone subscriber's home telephone services to the switch in response to a query from the service control point. Using the returned information, the system is able to provide away-from-home calling service to the telephone subscriber.

In another embodiment, the present invention is a method for providing telephone services provisioned on a subscriber's home telephone line when the subscriber is away from home. The method includes the steps of provisioning a trigger on telephone switch that is encountered when a telephone subscriber attempts to use home telephone lines services while away from home, requesting authorization and validation information from the subscriber in response to the trigger. Further, the method includes the steps of requesting authorization and validation information, transmitting that information to a service control point, and confirming that the subscriber is authorized access to the away-from-home calling service. If the user is authorized, then the step of returning telephone services provisioned on the subscriber's home telephone line to the switch is performed.

Thus, one object of the present invention is to provide access to home telephone services to subscribers when they are away from home.

Another object of the present invention is to provide telephone subscribers with reduced telephone charges when they are away from home.

Yet another object of the present invention is to create an alternative calling card service that provides increased functionality over existing calling cards.

These and other objects of the present invention are described in greater detail in the detailed description of the invention, the appended drawings and the attached claims.

DETAILED DESCRIPTION OF THE PREFERRED EMBODIMENTS

Figure 1:
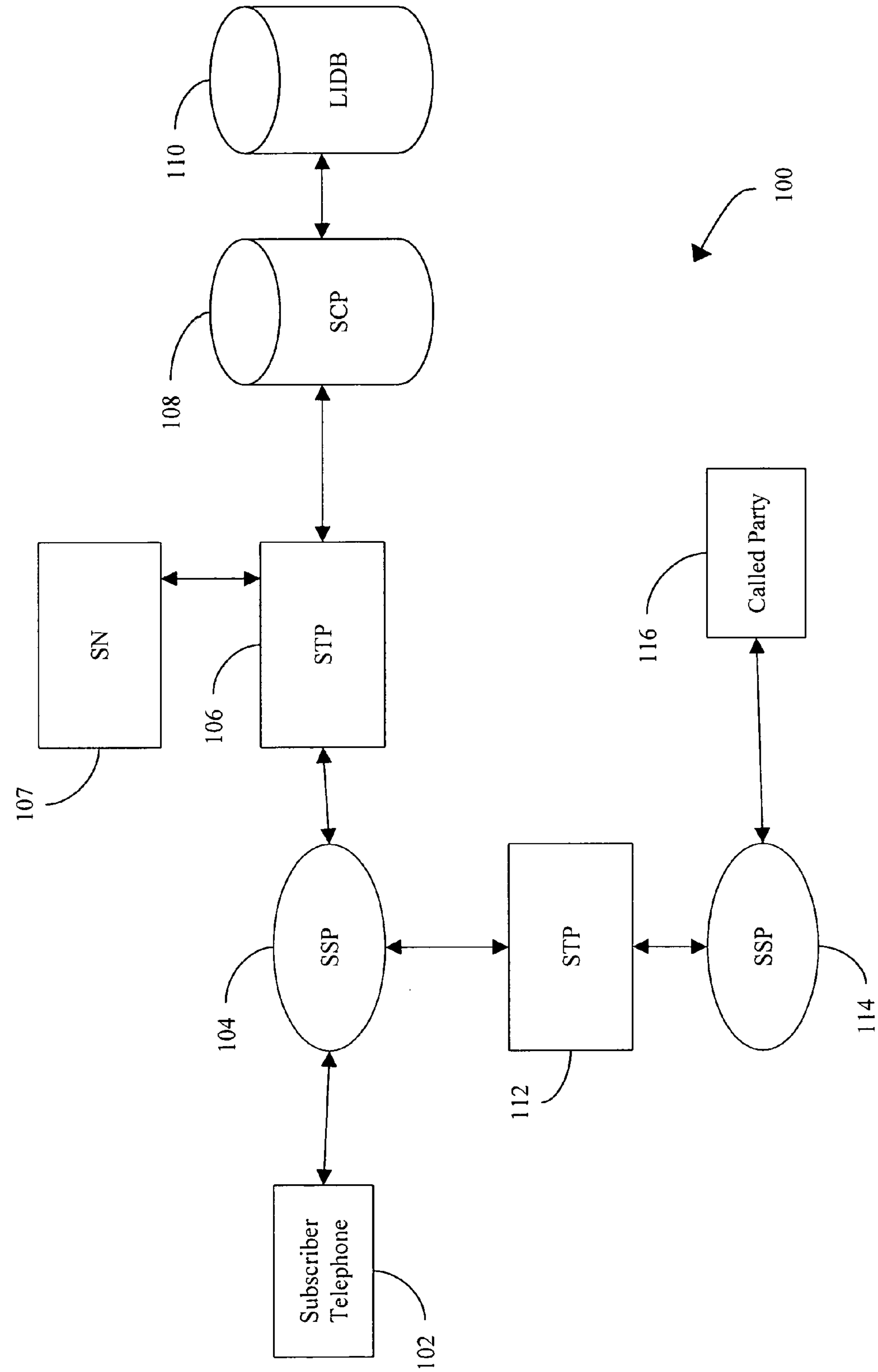
FIG. 1 is a schematic diagram of an away from home calling service system according to a preferred embodiment of the present invention.

FIG. 1 illustrates schematically a system 100 according to a preferred embodiment of the present invention. System 100 is owned preferably by a service provider (not shown) that provides the away-from-home calling service described herein. A telephone subscriber 102 dials an access telephone number to gain access to system 100. Preferably, the telephone number is a toll free number, such as the well-known 800 service. An SSP 104 intercepts telephone subscriber 102's telephone call using any of a number of well-known triggering techniques, for example a public office dialing plan (PODP) or termination attempt trigger (TAT) trigger. In response to the trigger, SSP 104 prompts telephone subscriber 102 for his or her home telephone number and a security code, preferably a personal identification number ("PIN"). Telephone subscriber 102 enters this information using the telephone keypad. In a preferred embodiment of the present invention, the telephone number and PIN are printed on an away-from-home calling card, which telephone subscriber 102 can carry with him or her. In the preferred embodiment, the information entered by telephone subscriber 102 is transferred to SSP 104 using well-known DTMF signalling. SSP 104 then queries line information database (LIDB) 110, as explained below, to verify and authenticate telephone subscriber 102 using the information entered by telephone subscriber 102. LIDB 110 contains information on the various services that are provisioned on a particular line, including, for example, long distance service provider, special local services, etc. Although shown as a device separate from SCP 108 in FIG. 1, LIDB 110 can be co-located with SCP 108.

SSP 104 accesses database 110 through signaling transfer point (STP) 106 and service control point (SCP 108) using the SS7 network and its signaling techniques. The SS7 network and signaling techniques are described in U.S. Pat. No. 5,701,301 and ANSI standard document IT.110-1992, Signaling System No. 7 (557)—General Information, both of which are incorporated by reference herein in their entireties. SCP 108 acquires the telephone number and PIN entered by telephone subscriber 102 from SSP 104 over the SS7 signaling system. Using the entered telephone number as an index, SCP 108 queries LIDB 110 to obtain the PIN associated with the entered telephone number. SCP 108 compares the obtained PIN with the PIN entered by telephone subscriber 102. If they match, the telephone subscriber is authorized to use the card. Consequently, SCP 108 sends a user authorized message back to SSP 104, and processing continues as described below.

If they do not match, SCP 108 returns a failed authorization message to SSP 104. In a preferred embodiment, SSP 104 notifies telephone subscriber 102 that authorization failed and hangs up. In an alternate preferred embodiment, SSP 104 prompts telephone subscriber 102 to reenter the PIN, whereupon the validation and authorization process described above is repeated. Preferably, telephone subscriber 102 is allowed three tries before SSP 104 hangs up. In a preferred embodiment, a record is kept of failed tries (either every failed try or failure after a number of attempts, or both). This record can be used to track invalid attempts to use the system and to indicate attempts at unauthorized access. For example, invalid attempts could indicate that a card has been lost unbeknownst to the true owner.

When the subscriber is authorized and validated, the subscriber is given a prompt, for example, a dial tone, indicating that he or she can use the services provisioned for his or her home telephone at the remote location. That is, subscriber 102 can then dial called party 116 in the usual manner, using the services that he or she has available when calling from home. The prompting is preferably performed by SSP 104. When the trigger (e.g., TAT or PODP trigger described above) is encountered, a message is sent to SCP 108 requesting authentication and validation of telephone subscriber 102. In addition, telephone subscriber 102's home telephone services are obtained.

In an alternative preferred embodiment of the present invention, a service node 107 performs the prompting of subscriber 102 to obtain the required information. In the alternative embodiment, when subscriber 102 calls the access number to use the service provided by the present invention, SSP 104 directs the call to service node 107. Service node 107 performs the prompting to telephone subscriber 102 to obtain the necessary information for authentication and validation for telephone subscriber 102.

When the call reaches service node 107, it encounters a basic rate interface (BRI) or primary rate interface (PRI) termination event. As is well-known, the trigger type depends on the trunk type that the call is carried on. Upon encountering the termination event, service node 107 prompts telephone subscriber 102 for the information required to allow the subscriber to use the service of the present invention, for example, telephone number and PIN. Service node 107 passes the information obtained to SCP 108 to authenticate and validate telephone subscriber 102 by querying LIDB 110. In addition, the services provided on telephone subscriber 102's home telephone line are obtained by query to LIDB 110. After telephone subscriber 102 is authenticated and validated, service node 107 prompts telephone subscriber 102 to dial the telephone number of called party 116. The call is completed, if possible, as if telephone subscriber 102 had made the call from his or her home telephone.

To provide access to the services provisioned on the home telephone number, telephone subscriber 102's home service information is transmitted to SSP 104. The home service information includes both telephone subscriber 102's local information and long distance information, for example, long distance carrier, and any services that telephone subscriber 102 has than can be used from a remote location. These services can then be accessed by telephone subscriber 102 from the remote location. It should be noted that the present invention can be used with any kind of telephone.

In an alternative preferred embodiment of the present invention, telephone subscriber 102 is assigned an away-from-home account number, which he or she enters after dialing the access telephone number. Using a lookup table, SCP 108 determines the subscriber's telephone number from the away-from-home account number. The lookup table can be stored in LIDB 110 or some other database. Processing continues as described above for the case where the subscriber enters his or her telephone number.

Figure 2:
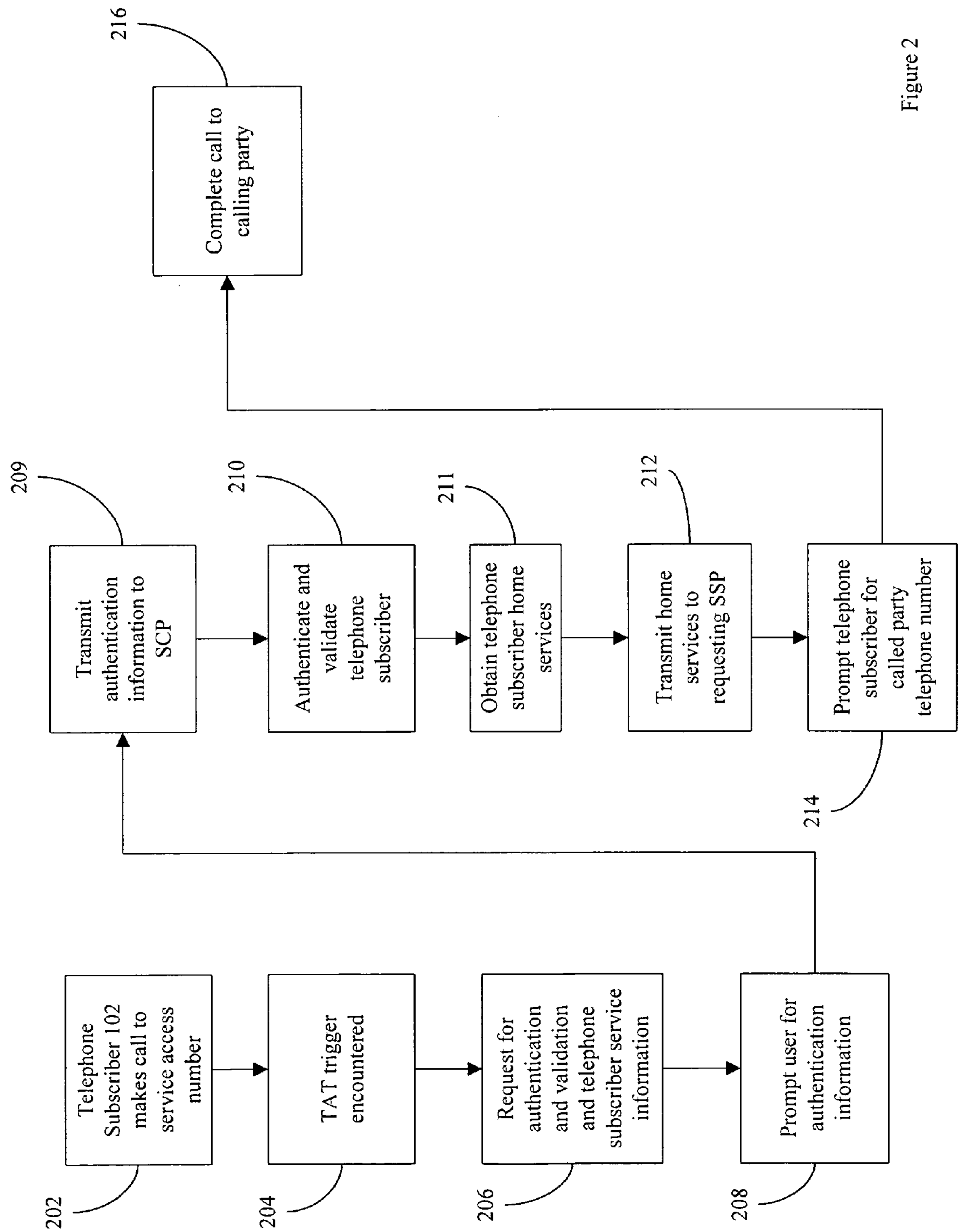
FIG. 2 is a flow chart for a method of performing an away from home calling service according to a preferred embodiment of the present invention.

Referring to FIG. 2, a flow chart illustrating the flow of a telephone call according to a preferred embodiment of the present invention is illustrated. In step 202 calling party 102 dials an access number, e.g., an 800-number as described above. The telephone call reaches SSP 104 in step 204 where it encounters a trigger (e.g., a TAT or PODP trigger as described above). The trigger causes SSP 104 to send a request to SCP 108 to authenticate and validate telephone subscriber 102 in step 206. The request also includes a request to obtain the services provisioned for telephone subscriber 102's home telephone line. This request is routed by STP 106 to SCP 108. In step 208, SCP 108 instructs SSP 104 to play a prompt to telephone subscriber 102 to enter his or her authentication information, e.g., telephone number and PIN. As described above, the authentication information can be printed on an away-from-home calling card that the telephone subscriber 102 carries. Telephone subscriber 102 enters this information. SSP 104 receives the information and transmits it to SCP 108 in step 209. Using the information received from SSP 104, SCP 108 queries LIDB 110 in step 210 to authenticate and validate telephone subscriber 102. Preferably, this authentication and validation includes a database lookup to compare telephone subscriber 102's telephone number with LIDB 110 records to ensure that telephone subscriber 102 is a subscriber of the away from home calling service of the present invention, and to ensure that the PIN number is correct. SCP 108 also obtains the services provisioned in step 211. In an alternate preferred embodiment, SCP 108 obtains telephone subscriber 102's home services at the time it performs the authentication and validation of telephone subscriber 102. These services are transferred to SSP 104 in step 212.

If the user is validated and authenticated, SCP 108 prompts telephone subscriber 102 to enter the number of called party 116 in step 214. The call is then routed to called party 116's SSP 114 for completion to called party 116 in step 216. Any signaling required to transfer the telephone call from SSP 104 to SSP 114 is routed through STP 112.

If telephone subscriber 102 is not validated or authenticated in step 209, SCP preferably instructs SSP 104 to send a message to telephone subscriber 102 indicating that authorization and/or validation has failed. Preferably, SSP 104 prompts telephone subscriber 102 to retry the information. A maximum of three attempts is allowed in the preferred embodiment. If telephone subscriber 102 fails authorization and/or validation three times, SSP 104 terminates the telephone call. In a preferred embodiment of the present invention, SSP provides an explanation for terminating the telephone call, that is, that the maximum number of failures has been reached, prior to terminating the telephone call.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for providing away-from-home calling service in which a subscriber makes a telephone call from a subscriber telephone; comprising:

a switch coupled to the subscriber telephone on which a trigger is provisioned to intercept telephone calls intending to use the calling service;

a service control point coupled to the switch provisioned to receive authentication information from the switch, wherein the authentication information is entered by the subscriber through a telephone keypad;

a line database storing authentication information and services information associated with the authentication information regarding home telephone services provisioned on the subscriber's home telephone line, wherein after the service control point acquires the authentication information from the subscriber through the switch, the service control point performs a look-up of the received authentication information within the line database to find the authentication information and the associated services information stored in the line database, and provides the information regarding the home telephone services that is found by the look-up to the switch if the received authentication information and the authentication information obtained from the line database matches, and wherein the switch completes the telephone call using the telephone services provisioned on the subscriber's home telephone line returned to the switch.

2. The system recited in claim 1, wherein the telephone subscriber is prompted to enter call completion information after being authenticated.

3. The system recited in claim 2, wherein the call completion information comprises a called party telephone number.

4. The system of claim 1, wherein the line database further includes billing parameters associated with the authentication information that specify that bills go to an account corresponding to the home telephone of the subscriber such that the completed call is billed to the account corresponding to the home telephone.

5. A method for providing an away from home calling service, comprising the steps of:

dialing an access number by a caller to access the away from home calling service, wherein the dialing triggers a switch;

prompting the caller for authentication information, wherein the caller's authentication information is entered by the caller through a telephone keypad;

performing a look-up of the entered authentication information within a line database to find authentication information and to find home services information associated with the authentication information that is stored in the database;

authenticating the caller at a service control point by comparing the authentication information received from the caller with the authentication information found in the database;

delivering the home service information found in the database to the switch if the authentication information received from the caller matches with the stored authentication information;

prompting the caller for call completion information; and completing the telephone call using the telephone services provisioned on the subscriber's home telephone line.

6. The method recited in claim 5, further comprising the step of prompting the caller for call completion information.

7. The method recited in claim 5, further comprising the step obtaining a PIN from the caller.

8. The method of claim 5, wherein the line database further includes billing parameters associated with the authentication information that specify that bills go to an account corresponding to the home telephone of the caller, the method further comprising obtaining the billing parameters from the look-up of the entered authentication information to bill the call to the account corresponding to the home telephone.

9. A system for allowing a telephone subscriber to make a telephone call from a remote telephone using services provisioned on the telephone subscriber's home telephone comprising:

means for receiving a telephone call from a caller;

a trigger provisioned to respond to the received telephone call by sending a message to a service control point;

means for prompting the caller to enter authentication information, wherein the authentication information is entered by the subscriber through a keypad of the remote telephone;

means for sending the authentication information to the service control point, wherein the service control point receives the entered authentication information, performs a look-up of the received authentication information within a line database to find authentication information and home services provisioned on the caller's home telephone line that are associated with the authentication information and compares the received authentication information with authentication information stored in the line database;

means for receiving a message containing the home services provisioned on the caller's home telephone line that is sent from the service control point once the received authentication information has been matched with the authentication information from the line database;

means for prompting the caller for call completion information; and means for completing the call in accordance with the call completion information and home services information.

10. The system of claim 9, wherein the authentication and validation information comprises a PIN.

11. The system of claim 9, wherein the authentication information comprises an account number.

12. The system of claim 9, wherein the line database further includes billing parameters associated with the authentication information that specify that bills go to an account corresponding to the home telephone of the caller such that the completed call is billed to the account corresponding to the home telephone.

13. A method for providing telephone services provisioned on a subscriber's home telephone line when the subscriber is away from home, comprising the steps of:

provisioning a trigger on a switch that is encountered when a subscriber attempts to use home telephone line services while away from home;

requesting authentication information from the subscriber when the trigger is encountered, wherein the authentication information is entered by the subscriber through a keypad of a remote telephone;

transmitting the authentication information to a service control point;

performing by the service control point a look-up of the transmitted authorization information within a line database to find authentication information and telephone services provisioned on the subscriber's home telephone line associated with the authentication information;

confirming the subscriber at the service control point is a valid user on the basis of comparison of the authorization information from the subscriber to the authentication information of the line database;

returning the telephone services provisioned on the subscriber's home telephone line to the switch if the subscriber is a valid user; and completing a telephone call using the telephone services provisioned on the subscriber's home telephone line.

14. The method recited in claim 13, further comprising the step of obtaining call completion information from the subscriber after the subscriber has been validated.

15. The method recited in claim 13, further comprising the step of obtaining a PIN from the subscriber as part of the authentication information.

16. The method of claim 13, wherein the line database further includes billing parameters associated with the authentication information that specify that bills go to an account corresponding to the home telephone of the subscriber, the method further comprising obtaining the billing parameters from the look-up of the transmitted authentication information to bill the call to the account corresponding to the home telephone.

17. A computer readable medium having instructions that when performed by one or more computers results in provisioning of an away-from-home telephone service, the acts comprising:

intercepting a telephone call from a subscriber of the away-from-home telephone service intending to use the away-from-home calling service;

receiving an authentication information, wherein the authentication information is entered by the subscriber through a telephone keypad;

performing a look-up of the received authentication information within a line database to find the authentication information and services information associated with the authentication information that are stored in the line database and determining whether the received authentication information matches the stored authentication information;

upon finding that that received authentication information and the stored authentication information matches, completing the telephone call using the telephone services provisioned on the subscriber's home telephone line that are specified by the services information found during the look-up of the received authentication information.

18. The computer readable medium of claim 17, wherein the acts further comprise prompting the subscriber to enter call completion information after being authenticated.

19. The computer readable medium of claim 18, wherein the call completion information comprises a called party telephone number.

* * * * *